(12) United States Patent
Bursell

(10) Patent No.: US 8,583,920 B1
(45) Date of Patent: Nov. 12, 2013

(54) SECURE ADMINISTRATION OF VIRTUAL MACHINES

(75) Inventor: Michael Hingston McLaughlin Bursell, Halstead (GB)

(73) Assignee: Citrix Systems, Inc., Bedford, MA (US)

(*) Notice: Subject to any disclaimer, the term of this patent is extended or adjusted under 35 U.S.C. 154(b) by 0 days.

(21) Appl. No.: 13/455,221

(22) Filed: Apr. 25, 2012

(51) Int. Cl.
*H04L 29/06* (2006.01)

(52) U.S. Cl.
USPC .......................................................... 713/164

(58) Field of Classification Search
USPC .............................................. 726/1, 21, 27–30
See application file for complete search history.

(56) References Cited

U.S. PATENT DOCUMENTS

| | | | |
|---|---|---|---|
| 7,103,653 | B2 | 9/2006 | Iwatani |
| 7,921,189 | B2 | 4/2011 | Kapoor et al. |
| 7,949,677 | B2 | 5/2011 | Croft et al. |
| 8,010,656 | B2 | 8/2011 | Baron et al. |
| 2007/0180493 | A1* | 8/2007 | Croft et al. .................. 726/2 |
| 2007/0186212 | A1* | 8/2007 | Mazzaferri et al. ............ 718/1 |
| 2009/0328225 | A1* | 12/2009 | Chambers et al. ............ 726/26 |
| 2012/0054744 | A1* | 3/2012 | Singh et al. .................. 718/1 |
| 2012/0096461 | A1* | 4/2012 | Goswami et al. ............. 718/1 |

OTHER PUBLICATIONS

Jul. 22, 2013 International Search Report and Written Opinion issued in International Application No. PCT/US13/37774.

* cited by examiner

*Primary Examiner* — Beemnet Dada
(74) *Attorney, Agent, or Firm* — Banner & Witcoff, Ltd.

(57) ABSTRACT

Methods and systems for performing secure administration of virtual domain resource allocation are provided herein. A cloud service provider (CSP) may provide instances of virtual machines to one or more contracting user entities. The cloud service provider may store an authorization database identifying one or more resources (e.g., storage, CPU, etc.) that each of the different contracting user entities is authorized to use on a virtual machine server device. The CSP may subsequently receive a request from an unverified entity to instantiate a virtual machine with access to one or more resources. The request may include security information. The CSP validates the request by verifying the unverified entity using the first security information (e.g., checking a PKI certificate, requiring a login/password, etc.) and, when the request is validated, provides access to the verified entity to a subset of the requested one or more resources based on the authorization database.

21 Claims, 5 Drawing Sheets

SECURE ADMINISTRATION OF VIRTUAL MACHINES

FIELD

This application generally relates to computers and computer networks. In particular, this application relates to methods and systems for securely administering virtual machines and assignment of capabilities to guest domains.

BACKGROUND

Traditionally, personal computers included operating systems, applications, and user settings for a single user. Personal computers were generally both used and managed by their owners. However, many organizations are now using virtualization, remote access and/or clouds of computing resources to fulfill their computing needs. Clouds of virtualized computing resources generally allow for the operating systems, applications, and user settings of multiple users to be included on a single physical machine. Desktop virtualization technology allows multiple instances of an operating system to be kept separate, so the activities of one user do not affect the experiences of other users. Cloud computing environments allow for computers owned by a cloud operator to be managed by the cloud operator but used by cloud users, who may be customers of the cloud operator. However, setup and administration of each virtual machine or device can be a time consuming and tedious process.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

According to one aspect of the disclosure, a device such as a virtualization server may be configured (e.g., using software) to receive a request from an unverified entity to provide a first instance of a virtual machine with access to one or more resources. The request may include security information usable to validate the request. When the request is validated, the virtualization server may provide access to the verified entity to a subset of the one or more requested resources based on information in an authorization database. The authorization database identifies one or more resources that each of a plurality of entities is authorized to use on the virtualization server. Aspects described herein may alternatively be implemented as a method, or as computer readable instructions stored on a computer storage media or in memory on a device. According to some aspects, when resources are not permitted or not available on the virtualization server, substitute resources may automatically be selected or used, or access may be denied.

According to some aspects, verifying the unverified entity includes determining whether the request was signed using a certificate (e.g., a cryptographically signed PKI certificate) corresponding to the unverified entity.

According to some aspects, controlled resources may include resources that alter a state of a virtual machine by performing at least one of: instantiating a virtual machine, hibernating a virtual machine, and resuming a hibernating virtual machine. According to other aspects, controlled resources may modify one or more rights of an already instantiated virtual machine.

According to various aspects, resource restrictions may be used, e.g., time-based restrictions and/or affinity-based restrictions (restrictions on co-tenants allowed to instantiate virtual machines on the same virtualization server).

BRIEF DESCRIPTION OF THE DRAWINGS

Figure 1:
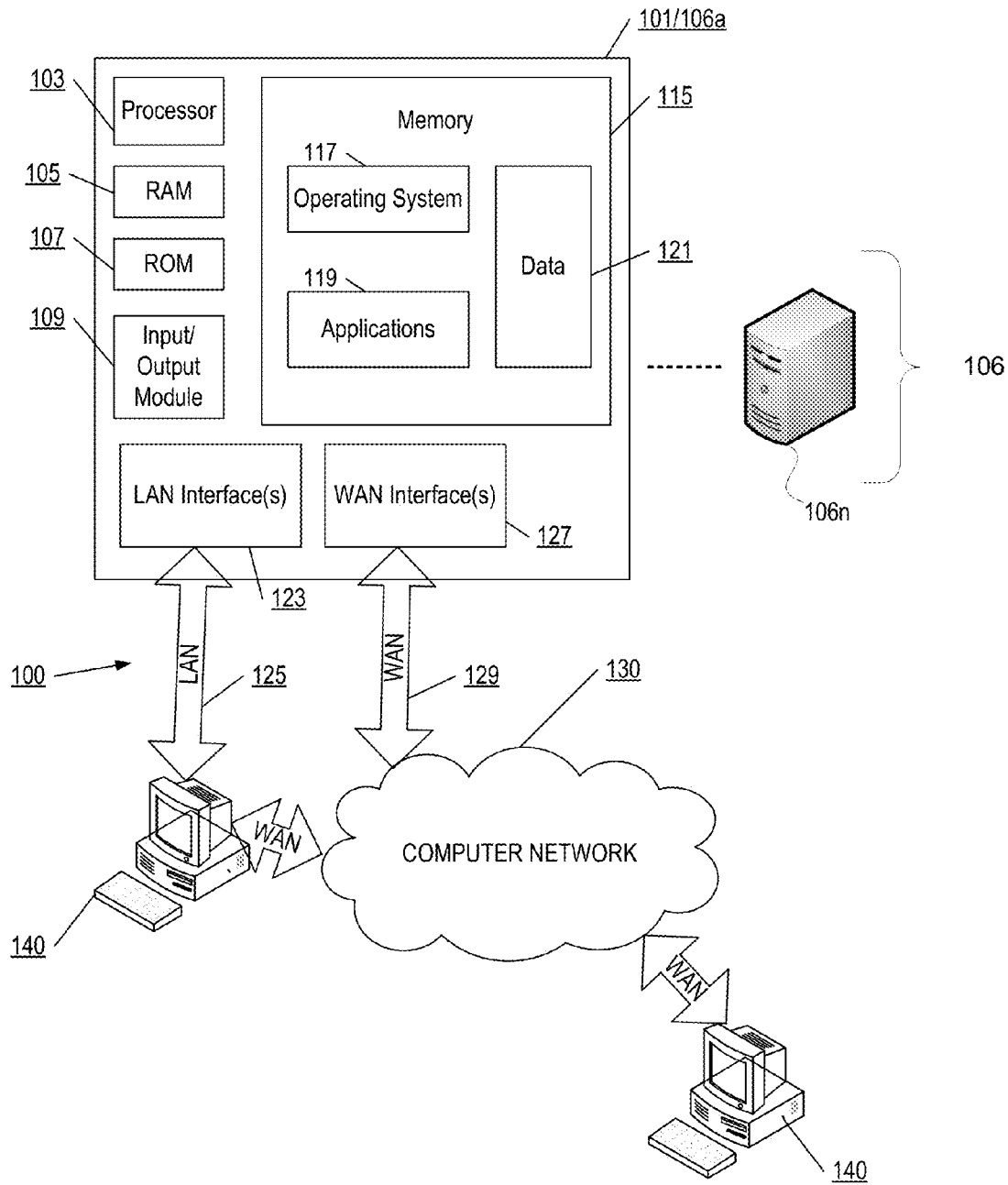

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
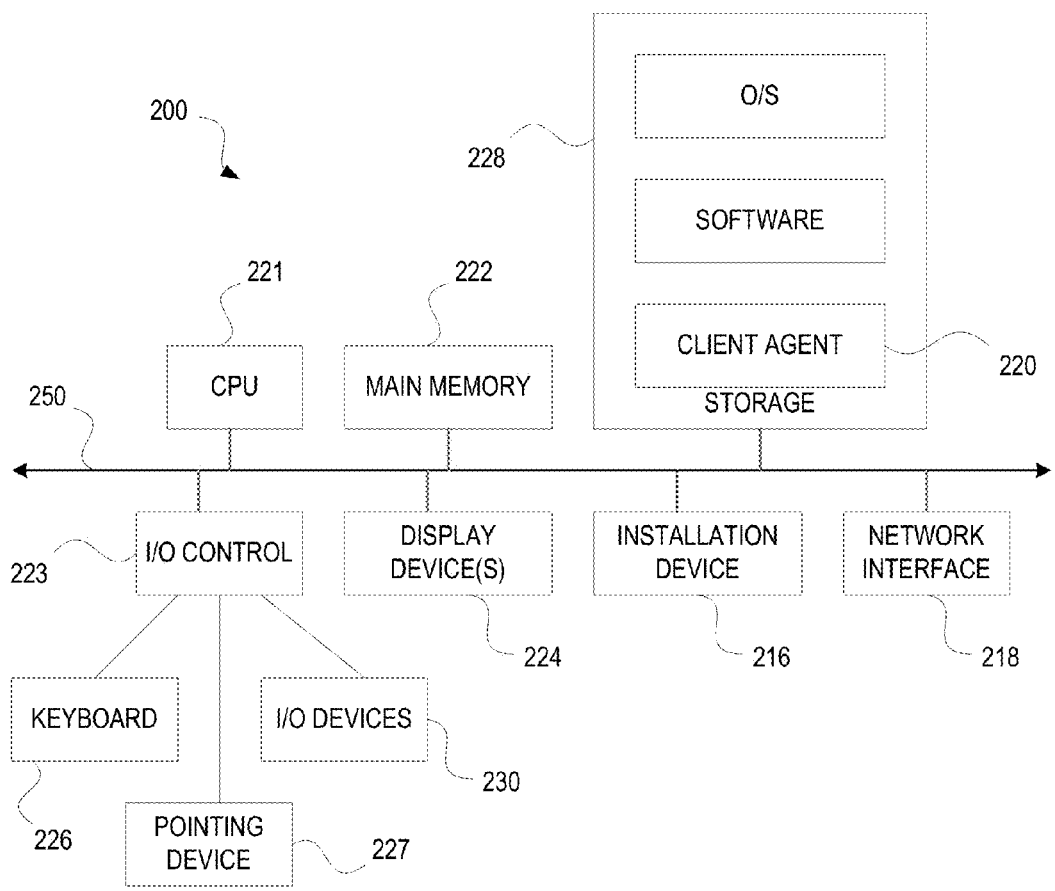

FIG. 2 illustrates a computing device that may be used in accordance with one or more illustrative aspects described herein.

Figure 3:
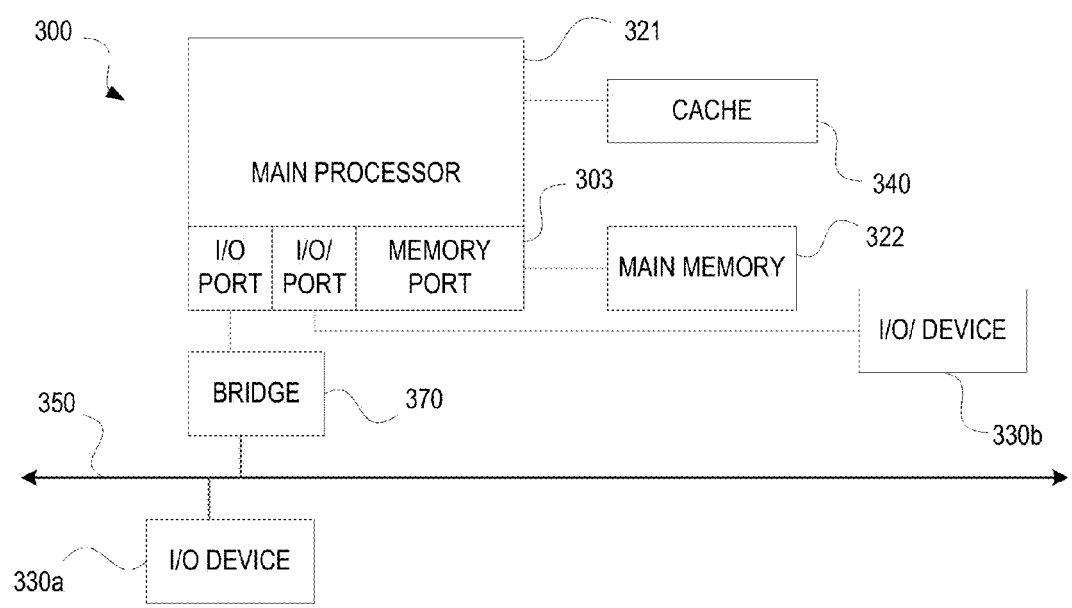

FIG. 3 illustrates a computing device that may be used in accordance with one or more illustrative aspects described herein.

Figure 4:
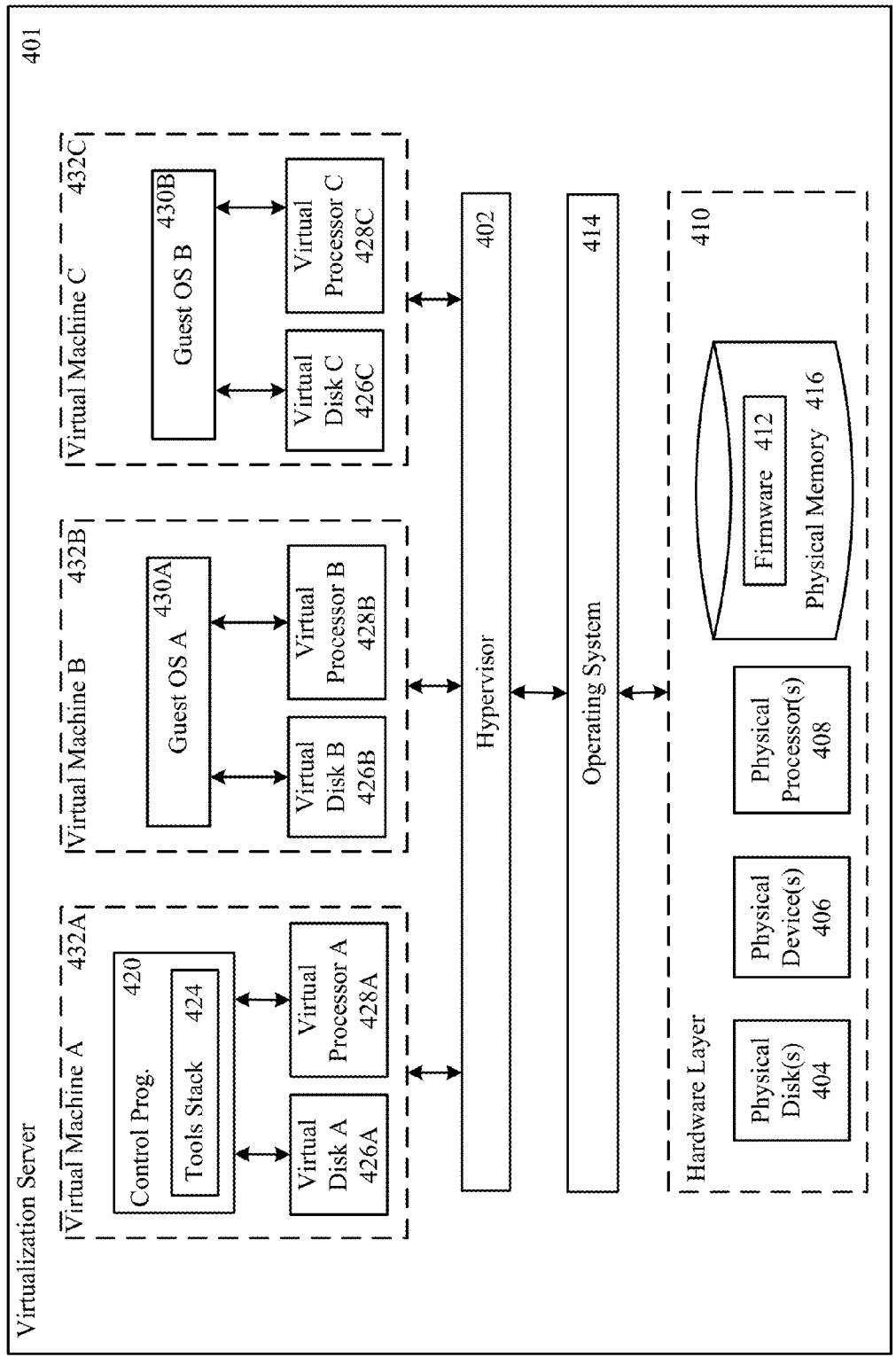

FIG. 4 is a block diagram that depicts embodiments of a virtualization server in accordance with one or more illustrative aspects described herein.

Figure 5:
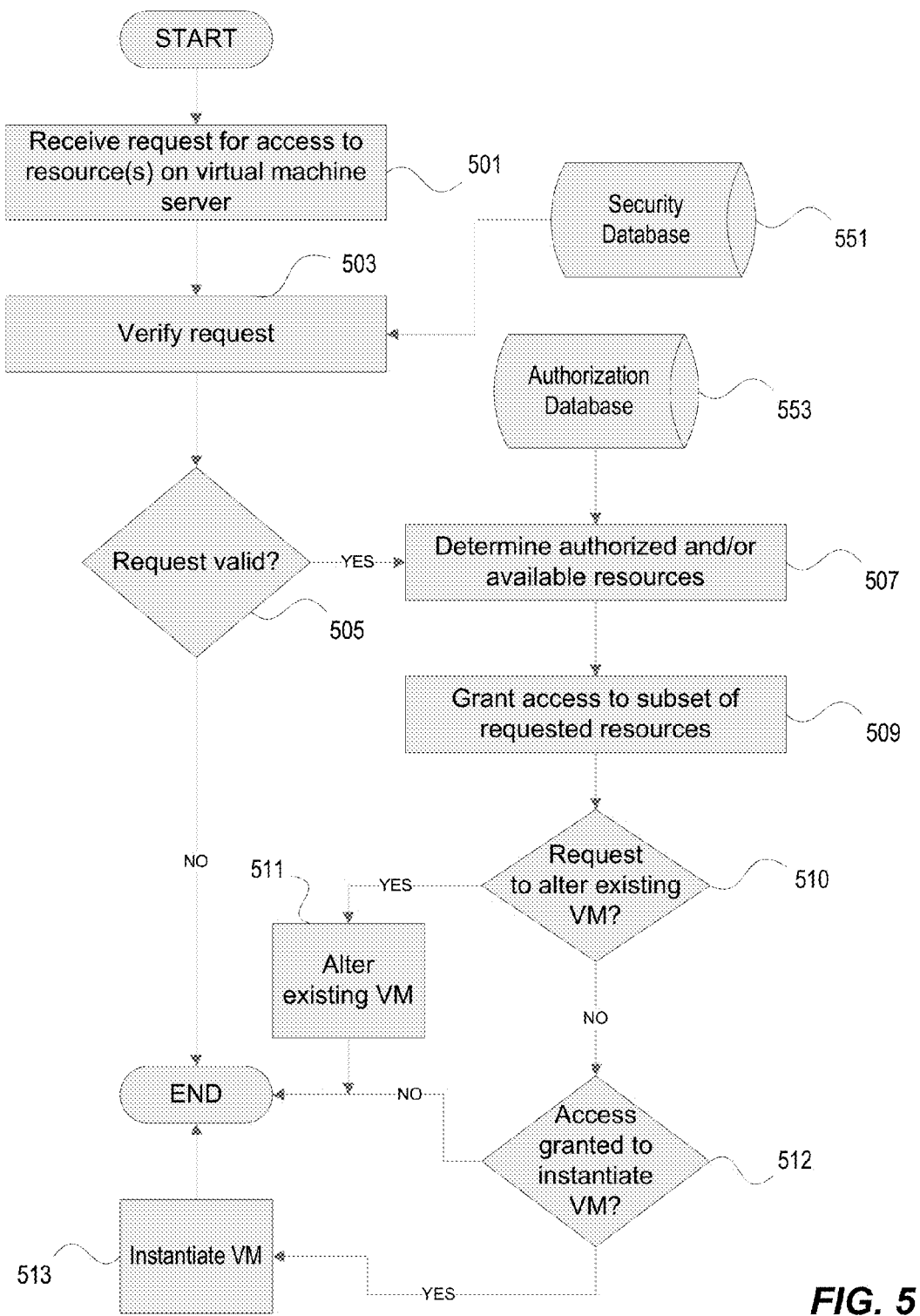

FIG. 5 illustrates a method of performing secure administration according to one or more aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330*a*. In another embodiment, the bridge 370 is in further communication with the main central processing unit 321, where the central processing unit 321 can further communicate with a second I/O device 330*b*, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330*a*-330*n*. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330*a*-330*n* that includes a video display 224 that communicates with the central processing unit 321. Still other versions of the computing machine 300 include a processor 321 connected to an I/O device 330*a*-330*n* via any one of the following connections: HyperTransport, Rapid I/O, or InfiniBand. Further embodiments of the computing machine 300 include a processor 321 that communicates with one I/O device 330*a* using a local interconnect bus and a second I/O device 330*b* using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif. While FIGS. 1-3 may be described with respect to specific examples of hardware and/or software that may be used, such examples are in no way limiting, but instead are merely illustrative of the type of resources that may be utilized as technology progresses.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer 410 that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can execute, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks 404; physical processors 408; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may execute a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may present at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 may include a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the hypervisor 402 provides a modified view of the virtual processor 428 such that at least some of the characteristics of the virtual processor 428 are different than the characteristics of the corresponding physical processor 408.

A method of granting access to one or more resources available on virtualization server 401 is described with further reference to FIG. 5. Resources may include any device, equipment, memory, interface, port, or consumable item that can be made accessible to an instantiation of a virtual machine 436 instantiated on virtualization server 401. Resources may include, e.g., storage allocation, network access, network bandwidth, printers, domain access, access to specified Internet URLs, VLAN, queuing strategy levels, Bluetooth devices (or any other hardware), other virtual machines, display, vGPU, graphics card, USB or other port, services or daemons provided by the host, intra-host communications, inter-host communications, cryptographic protocols or primitives, ability to instantiate, suspend, shutdown, resume, hibernate, backup or restore virtual machine(s), or otherwise alter a state of a virtual machine. This list of resources is not exclusive but rather is illustrative, and other resources may also or alternatively be used.

Initially, in step 501, virtualization server 401 receives a request for access to one or more resources on server 401. The request may include an indication that it originates from a particular entity. However, until the request is verified in step 503, the request is considered to originate from an unverified entity. The request may include security information, such as a signed security certificate (e.g., signed using a PKI certificate), or the request may be preceded by security verification (e.g., a user might be required to log in using a login, password, security questions, etc.). Any secure verification scheme may be used in step 503. When the request includes a signed security certificate, the server in step 503 may compare the signed certificate to a known certificate corresponding to that entity as stored in security database 551. Security database 551 may be stored locally on virtualization server 401 or may be stored remotely and be accessible to virtualization server 401.

In step 505 virtualization server determines whether the request is valid based on the results of step 503. If the request is not valid, then virtualization server may simply ignore the request and end, or perform some other remedial action. If the request is valid, then virtualization server 401 in step 507 determines what resource(s) to grant access to based on one or more of 1) resources identified as requested resources in the request; 2) resources identified as authorized resources in authorization database 553 storing data indicating which entities are entitled access to which resources; and 3) resources actually available on virtualization server 401. In step 509 server 401 may grant access to all of the requested resources, some of the requested resources, or a modified set of the requested resources.

In one scenario, virtualization server 401 may determine that all requested resources are included within the list of authorized resources identified in authorization database 553, and all requested resources are available on server 401. Thus, in step 509 server 401 may grant access to all requested resources.

In another possible scenario, server 401 may determine that all requested resources are included within the list of authorized resources identified in authorization database 553, but that not all resources exist on server 401. For example, the request might include a request for a virtual machine to have access to the Internet. However, server 401 might be a secure server that is not connected to the Internet or that does not allow access out to the Internet. In such a case, the request for access to the Internet would be denied.

In another possible scenario, server 401 may determine that all requested resources are included within the list of authorized resources identified in authorization database 553, but that not all resources are available on server 401. For example, the request might include a request for storage allocation of 2 terabytes to a particular virtual machine. However, server 401 might only have 1 terabyte remaining Server 401 may therefore only allocate 1 terabyte instead of the requested 2, and inform the requesting entity (e.g., user, requesting software, automated process, etc.) of any discrepancy between the resource requested and resulting allocation. As another example, the request might include a request for access to a high-speed solid state storage device by a virtual machine (e.g., to mount as an additional volume of storage). However, server 401 might not include solid state storage, and instead only offers nonvolatile storage on a magnetic disk drive. Server 401 may offer the requestor a choice to use the magnetic drive instead, or to simply terminate the session.

In step 509 virtualization server 401 grants access to one or more resources based on the outcome of step 507. Any differences between the requested resources and the granted resources may be reported to the user so that the user can decide whether or not to proceed with the modified set of resources or to terminate the session and use a different virtualization server that may offer the desired resources.

In step 510 and 511, server 401 checks to see whether one of the requested resources involves altering a state of an existing virtual machine. If so, then server 401 in step 511 either automatically alters the state of the existing VM, or provides the ability to the requestor to perform the alteration as desired. In such a scenario, the request may also include further details regarding the particular virtual machine to be altered and how it is to be altered, e.g., altering memory, storage, bandwidth, etc. After altering, the method may end. Optionally, the method may reinitiate with another received request, e.g., to instantiate a new VM.

In steps 512 and 513, server 401 checks to see whether one of the requested resources is the ability to instantiate a virtual machine. If so, then server 401 may automatically instantiate a virtual machine responsive to the request. In such a scenario, the request may also include further details regarding the particular virtual machine to be instantiated, e.g., by operating system, memory, storage, bandwidth, etc.

Various aspects described above may be optional (e.g., 512-513, 551), and various steps may be reordered, combined, or split to accommodate a particular need or alternative embodiment. For example, step 512 may be a subset of or incorporated within step 509. Other modifications may also be made without departing from aspects described herein.

The method of FIG. 5 may be used, e.g., by hypervisor 402 or control domain 432A, to determine what capabilities, if any, a virtual machine can have based on automated verification of the requesting user. A control domain may be a special instance of a virtual machine that manages operations of virtualization server 401, and instructs hypervisor 402 (and O/S 414 in the case of a type 2 hypervisor) regarding 1) instantiation of additional virtual machines in guest domains, and 2) management of permissions of each guest domain with respect to access to requested resources. Control domain 432A may be said to mediate resource requests received from users and determine whether to instantiate virtual machines and/or allocate resources based as further described herein.

Requests for resources may be limited by various restrictions defined within the request itself, or defined within the authorization database. For example, aspects described herein may be useful in a multitenancy environment, and therefore affinity-based restrictions may be defined. One virtualization server may host multiple virtual domains, e.g., up to 80 or more. Multitenancy exists when a virtualization server is not dedicated to a particular client or organization. A cloud services provider may provide services to two companies, e.g., named Acme Inc. and Generi Corp. If the same virtualization server hosts guest domains for both Acme Inc. and Generi Corp., then the control domain must ensure that any requesting user has authorization to perform the requested actions, because more than one user or client may attempt to access that virtualization server, and that the actions of one company do not adversely impact the resources of another.

Allocation of resources is also useful to ensure that multi-tenant users do not share storage, and/or that each tenant's network traffic does not pass over the same connection. Aspects described herein are also useful, e.g., to ensure one tenant always has at least a predetermined portion of available CPU (e.g., 70%), or that a tenant always has a predetermined portion of available RAM (e.g., 50%). Aspects described herein allow for the secure partitioning of resources, so that if a highly secure tenant (e.g., the Department of Defense) shares a virtualization server with a potentially malicious tenant (e.g., Pirate Bay or WikiLeaks), both tenants are securely separated from each other. In another example, a resource request and/or the authorization database may include affinity-based restrictions. An affinity-based restriction is one that limits the co-tenants that a particular tenant determines to be an acceptable co-tenant on a same virtualization server. For example, the Department of Defense might have a restriction on sharing a virtualization server with WikiLeaks, despite the strength of the security measures included thereon. Thus, when any tenant requests to create a VM on a particular server, security and authorization information for all other tenants on that server might be checked to confirm that instantiating the new VM will not violate any anti-affinity restrictions.

In another example, time-based restrictions may be included with a request or defined by the authorization database. Time-based restrictions can include a time limitation on consecutive use of the resource (e.g., no more than three hours of consecutive Internet use), a time limitation on total use of the resource (e.g., no more than three hours total of Internet use), a limitation on the hours of one or more days the resource may be used (e.g., Internet allowed only between 9 AM-5 PM, M-F), a limitation on days of the week the resource may be used (e.g., access to Intranet NIC allowed only M-F), and an expiration date of the resource (e.g., Internet can be used as much as desired until May 20, 2012). Other time-based restrictions may also be used, including any discrete allocation of time for a particular resource, e.g., only during specified months, only between 2-3 PM on Apr. 13, 2012, etc.

The methods and systems described above may be altered or implemented in various operating environments while still providing secure administration of guest capabilities on a virtualization server. For example, in one embodiment, XenServer® by Citrix Systems. Inc. of Ft. Lauderdale, Fla., may be adapted to provide a capabilities grant matrix, which can be managed over a user interface, and which validates certificates against one or more Certificate Authorities. When validation is successful, XenServer® may grant the capabilities to use various resources (e.g., networking, certain amounts of memory, access to particular storage) to virtual machines instantiated from templates signed with these certificates.

The hypervisor (whether XenServer® or otherwise) could check a date validity of the certificate, a revocation status of the certificate, a validity of the certificate chain, a capability validity/availability, and/or VM template integrity (namely, does the certificate relate to this particular VM template?).

Some example use-case scenarios are now provided. In a first scenario, a first county's police department may use a cloud service provider (CSP). The police department has a dedicated virtual local area network (VLAN). The police department has an agreement with the CSP that all of its VMs which are part of the police department's 911 infrastructure have their network traffic given highest priority. The CSP sets up the police department's permissions in its capabilities matrix accordingly. Suppose the CSP receives a resource request from the police department to instantiate a VM, the request including a VM template requesting VLAN and 911 capabilities. The CSP checks the attached certificate to see if it is cryptographically signed by the county's root certificate. When the certificate is confirmed as being signed by the county's root certificate, based on the capability requests associated with the certificate, the CSP provides this VM with access to the police department VLAN and ensures maximum network traffic priority.

Alternatively, suppose the CSP receives a VM template from the police department, requesting only VLAN capabilities. Again, when the CSP confirms that the certificate is cryptographically signed with the county's root certificate, the CSP may instantiate this VM with VLAN access, but not with highest traffic priority.

In yet another alternative, suppose the CSP receives a VM template purporting to be from the county's police department, but which is actually received from a crime syndicate. Attached to the received template is a certificate, cryptographically signed by the crime syndicate's root certificate. The CSP checks the certificate, which fails to validate against the county's root certificate. The CSP may choose to instantiate the VM anyway, but will not provide it with access to the police department VLAN or give its network traffic high priority. When the CSP identifies the request as being malicious, the CSP might not instantiate the VM at all.

In some scenarios, resource access may be modified after a VM has been instantiated. In one example, a user using a particular VM may receive an automated warning that the VM is almost out of storage space. The user may send a request to an administrator for more storage space. The administrator may approve the request by creating a signed authorization for the VM to be allocated additional storage. The VM presents the request through a secure channel to the CSP. The CSP, upon validating that the request was signed by the county's root certificate, upgrades the storage allocated to that VM.

In another example, the first county might receive a contract from a neighboring second county to handle the second county's 911 calls. The second county might have its own VLAN, access to which may be required to handle 911 calls associated with the second county. The second county may provide a copy of its own certificate to the first county. VM's instantiated by the first county may subsequently present the second county's certificate to the CSP via a secure channel. The CSP checks the validity of the certificate, and based on a capabilities request associated with the second county's certificate, grants the VM access to a new network interface which is attached to the second county's VLAN.

In another use scenario, the virtualization server may grant capabilities to a trusted system domain instance ("appliance VM") based on the cryptographic certificate attached to the appliance template. Appliance domains may have higher levels of trusted access to system resources than standard guest domains, and may be required to pass a set of tests to show they do not contain malicious code and are from a trusted 3rd party provider. An organization managing a virtualization server may have the option of determining which providers to trust, and what resources to make available to instances of these application domains based on different capability requests. For example, suppose a network interface card (NIC) vendor creates an application domain storing its latest drivers. That vendor may have the application domain checked against a set of tests as required by the CSP. On passing, a certificate is issued (e.g., by the CSP, a partner, or other certificate issuing authority) to the vendor. Subsequently, a third party enterprise downloads the latest application domain template from the vendor and, based on the validity of the associated certificate, instantiates a trusted system domain having access to a subset of available system resources. Under appropriate conditions, the enterprise's VMs have access to the application domain, and thereby have access to the latest drivers offered by that vendor.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. A method comprising:
receiving a first request from an unverified entity to instantiate a first instance of a virtual machine, said first request defining a first set of one or more resources to be made available by a virtual machine server device to the first instance of the virtual machine, said first request including first security information;
validating the first request by verifying the unverified entity using the first security information;
accessing an authorization database, said authorization database identifying one or more resources, based on the verified entity, that the first instance of the virtual machine is authorized to use on the virtual machine server device;
responsive to validating the first request:
instantiating the first instance of the virtual machine with access to the subset of the first set of one or more resources;
wherein when a requested resource is not available to the virtual machine server device, providing access comprises providing access to an alternative resource based on the unavailable requested resource.

2. The method of claim 1, wherein verifying the unverified entity comprises determining whether the first request was signed using a certificate corresponding to the unverified entity.

3. The method of claim 2, wherein the certificate comprises a cryptographically signed public key infrastructure (PKI) certificate.

4. The method of claim 1, wherein providing access comprises superseding a resource requested in the first request based on information in the authorization database.

5. The method of claim 1, wherein providing access is limited by a time-based limitation for a requested resource based on information in one of the first request and the authorization database.

6. The method of claim 5, wherein the time-based limitation is selected from a group comprising:
a time limitation on consecutive use of the resource;
a time limitation on total use of the resource;
a limitation on hours of one or more days the resource may be used;
a limitation on days of the week the resource may be used; and
an expiration date of the resource.

7. The method of claim 1, wherein providing access is limited by an affinity-based access restriction defined within one of the first request and the authorization database.

8. One or more nontransitory computer readable media comprising computer readable instructions that, when executed, configure a virtualization server to perform:
receiving a first request from an unverified entity to instantiate a first instance of a virtual machine, said first request defining a first set of one or more resources to be made available by the virtualization server to the first instance of the virtual machine, said first request including first security information;
validating the first request by verifying the unverified entity using the first security information;
responsive to validating the first request:
determining a subset of the first set of one or more resources based on an authorization database identifying one or more resources that each of a plurality of entities is authorized to access, and
instantiating the first instance of the virtual machine with a subset of the first set of one or more resources;
wherein when a requested resource is not available to the virtual machine server device, providing access comprises providing access to an alternative resource based on the unavailable requested resource.

9. The computer readable media of claim 8, wherein verifying the unverified entity comprises determining whether the first request was signed using a certificate corresponding to the unverified entity.

10. The computer readable media of claim 9, wherein the certificate comprises a cryptographically signed public key infrastructure (PKI) certificate.

11. The computer readable media of claim 8, wherein providing access comprises superseding a resource requested in the first request based on information in the authorization database.

12. The computer readable media of claim 8, wherein providing access is limited by a time-based limitation for a requested resource based on information in one of the first request and the authorization database.

13. The computer readable media of claim 12, wherein the time-based limitation is selected from a group comprising:
   a time limitation on consecutive use of the resource;
   a time limitation on total use of the resource;
   a limitation on hours of one or more days the resource may be used;
   a limitation on days of the week the resource may be used; and
   an expiration date of the resource.

14. The computer readable media of claim 8, wherein providing access is limited by an affinity-based access restriction defined within one of the first request and the authorization database.

15. A virtualization server, comprising:
   a processor; and
   memory storing computer readable instructions that, when executed by the processor, configure the virtualization server to perform:
   receiving a first request from an unverified entity to instantiate a first instance of a virtual machine, said first request defining a first set of one or more resources to be made available by the virtualization server to the first instance of the virtual machine, said first request including first security information;
   validating the first request by verifying the unverified entity using the first security information;
   responsive to validating the first request:
      determining a subset of the first set of one or more resources based on an authorization database identifying one or more resources that each of a plurality of entities is authorized to access, and
      configuring instantiating the first instance of the virtual machine with a subset of the first set of one or more resources;
   wherein when a requested resource is not available to the virtual machine server device, providing access comprises providing access to an alternative resource based on the unavailable requested resource.

16. The virtualization server of claim 15, wherein verifying the unverified entity comprises determining whether the first request was signed using a certificate corresponding to the unverified entity.

17. The virtualization server of claim 16, wherein the certificate comprises a cryptographically signed public key infrastructure (PKI) certificate.

18. The virtualization server of claim 15, wherein providing access comprises superseding a resource requested in the first request based on information in the authorization database.

19. The virtualization server of claim 15, wherein providing access is limited by a time-based limitation for a requested resource based on information in one of the first request and the authorization database.

20. The virtualization server of claim 19, wherein the time-based limitation is selected from a group comprising:
   a time limitation on consecutive use of the resource;
   a time limitation on total use of the resource;
   a limitation on hours of one or more days the resource may be used;
   a limitation on days of the week the resource may be used; and
   an expiration date of the resource.

21. The virtualization server of claim 15, wherein providing access is limited by an affinity-based access restriction defined within one of the first request and the authorization database.

* * * * *